H. L. JOHNSTON.
COFFEE POT.
APPLICATION FILED DEC. 21, 1911.
1,073,688.
Patented Sept. 23, 1913.
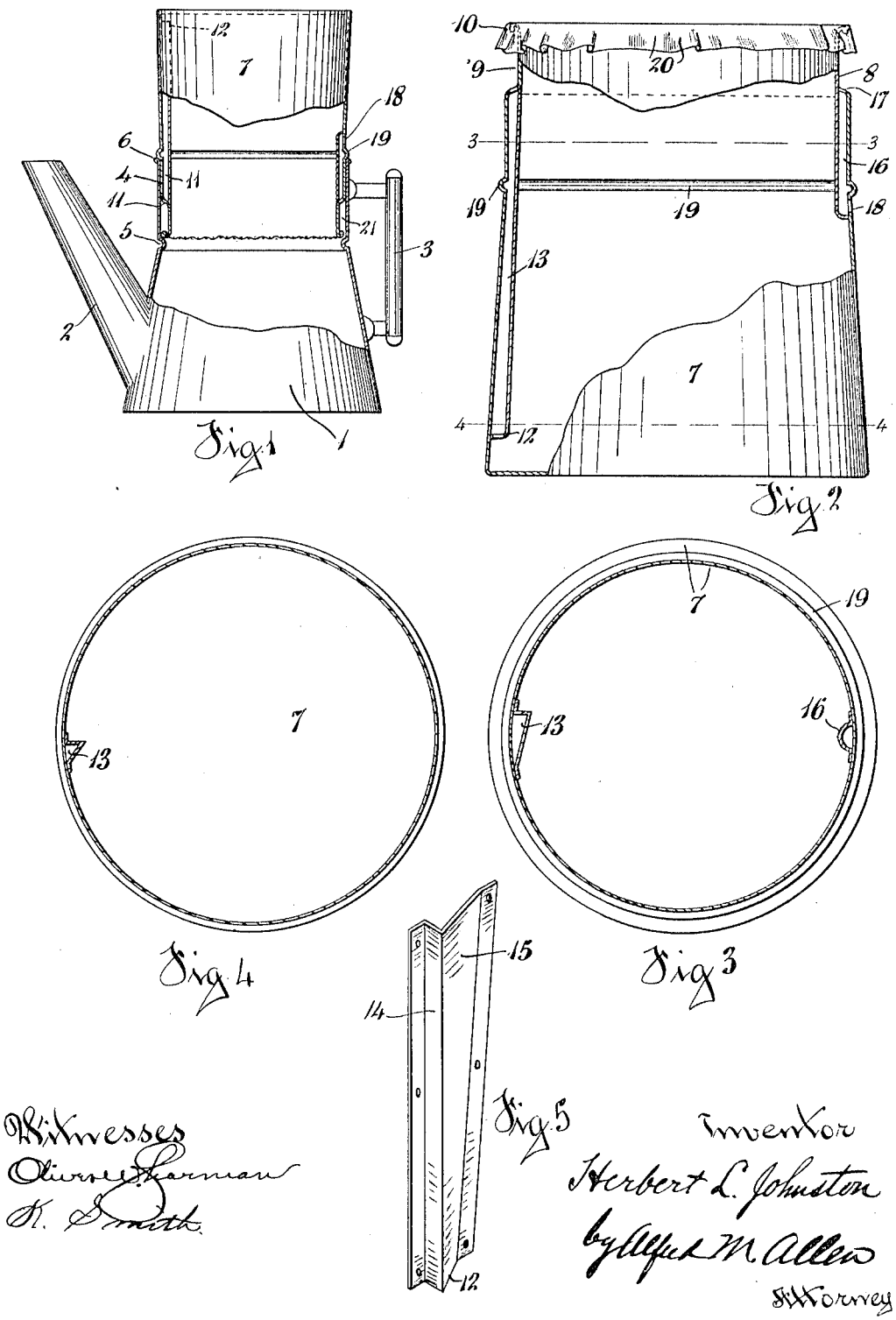

UNITED STATES PATENT OFFICE.

HERBERT L. JOHNSTON, OF TROY, OHIO.

COFFEE-POT.

1,073,688. Specification of Letters Patent. Patented Sept. 23, 1913.

Application filed December 21, 1911. Serial No. 667,147.

*To all whom it may concern:*

Be it known that I, HERBERT L. JOHNSTON, a citizen of the United States, and a resident of the city of Troy, in the county of Miami and State of Ohio, have invented certain new and useful Improvements in Coffee-Pots, of which the following is a full, clear, and exact description, reference being had to the accompanying drawing, forming part of this specification.

My invention relates to improvements in coffee pots for making of drip coffee, in which a cylindrical vessel is provided for the receipt of the ground coffee and the boiling water, in which after the coffee has steeped for the required time, the vessel is then provided with a strip of cloth or other suitable material across the top, and the vessel is then inverted over the main body of the coffee pot, so as to form a tight closure between the two parts and allow the coffee to drip into the coffee pot.

In order to prevent loss of strength by exposure to the air during the process of making, it is quite important that the coffee and water should be tightly sealed in the vessel, and as the coffee drips from the container, it is essential to prevent the formation of a vacuum to insure the effectual working of the device.

It is the special object of my invention to provide this necessary inlet passageway for the air when the container is inverted and held in position on the coffee pot so that there shall be no opening for leakage of the water before the container vessel is inverted.

My invention consists of the novel construction and arrangement of parts to be hereinafter particularly pointed out and claimed in which this object is attained automatically without the necessity for any valves or other closing devices.

In the drawing, Figure 1 is a side elevation partly in vertical section of my improved construction with the parts arranged for the dripping of the coffee into the pouring vessel. Fig. 2 is a side elevation of the container for the coffee and water before inversion over the pouring vessel. Fig. 3 is a cross section of this vessel, taken on the lines 3, 3, of Fig. 2. Fig. 4 is a similar cross section, taken on the lines 4, 4, of Fig. 2. Fig. 5 is a perspective view illustrating the construction of the air inlet tube.

The body of the coffee pot or pouring vessel 1 is of any desired size and shape, provided with the pouring spout 2 and the handle 3. The upper portion 4 of this vessel is cylindrical in shape, entirely open at the upper end, and there is preferably provided an annular bead 5 at the base of this portion and a bead 6 around the upper edge. The vessel 7 is a cylindrical vessel closed at one end and open at the other, of a size to fit within the pouring vessel when inverted and pushed down within the same. This vessel 7 is formed of less diameter than the body of the vessel, at or near its upper portion, at 8, to leave an annular recess 9 with the upper edge expanded to the full diameter of the vessel, and preferably provided with a bead 10. On the inside of this cylindrical vessel 7 extending from the base of the contracted portion nearly to the bottom of the vessel at 12, is a tube 13 formed triangular in shape as shown in Figs. 3 and 4 and in perspective in Fig. 5, one side of the tube being formed by the cylindrical wall of the vessel, and another side by a narrow wall of uniform width 14, with the remaining side 15 gradually narrowing in width from top to bottom, so that the angle of this side 15 with the side wall of the vessel constantly increases from the top to the bottom, when the vessel is in the erect position illustrated in Fig. 2. The tube is open at the bottom and opens through the wall of the vessel at 11. On the opposite side is formed another tube 16 which extends from the base of the contracted portion partway down the side wall of the vessel on the inside, just below the annular bead 19, and this tube is provided with openings 17 and 18 at each end through the wall of the vessel. Into this vessel 7 the coffee and boiling water are placed and over the top of the vessel is stretched a strainer 20 of cloth or other suitable material. The coffee pot 1 is then inverted over the vessel 7 and pushed down over the vessel, bringing the bead 10 against the bead 5 of the pouring vessel and locking the straining cloth in position between these parts. After being allowed to stand for a short time, the entire combination is then inverted, so that the coffee now drips through the straining cloth into the body of the coffee pot. As the liquid flows from the upper vessel, with the bead 19 resting on the upper edge 6 of the lower vessel, air enters through the opening 18 and tube 16 into the annular passageway 21 and thence through the opening at 11 into the tube 13 and out into the upper portion of the inverted vessel at 12. In this way, the formation of any vacuum in the inverted vessel is prevented. Some air will also pass from the pouring pot through the strainer 20 direct into the annular passage 21.

When the boiling water is poured upon the coffee in the vessel 7 before it is inverted, the water also fills the tube 13 and unless provision were made for the discharge of this water, by reason of the narrow diameter of the tube, the water would fail to drain off when the vessel was inverted, and thus the air inlet passageway would be stopped. In order to prevent this, the tube 13 is formed as described with one side 15 having in its inverted position a gradually diminishing angle with the side wall of the vessel. As the capillary attraction increases inversely as the angle between the two surfaces in contact, this capillary attraction draws the water in the tube 13 toward the smaller angle and also downwardly. Thus the liquid in the tube is drained off readily, and free passage for the entrance of air provided. Instead of a tube triangular in cross section, a flattened tube with gradually diminishing angles on opposite sides could be employed, and the sides could be curved as well as flat, the essence of the construction being the change of the angle of the sides.

While I have illustrated the tubes 16 and 13 on opposite sides of the vessel 7 and the passage 21 formed between the two vessels when placed together as an annular passage, it will be evident that the circumferential location of the tubes with reference to each other is not of importance, and that the passage 21 need only extend between the tubes. In fact, the tube 13, or a passage for air from the inside of the upper end, when inverted, of the vessel 7 to the lower end thereof opening outside the vessel is the feature of prime importance, and the tube 16 and passage 9 may be omitted without departing from the spirit of my invention in its broad interpretation. With the tube 13 alone in some instances, sufficient air can enter from the pouring vessel or around the sides of the two vessels to prevent the formation of a vacuum during the dripping process.

The great advantage of my construction over any construction in which an air inlet is provided, which is not automatic in its action, or which requires a cap for the inlet passageway to be closed by hand when the vessel is used to receive the coffee and water and to be opened or removed to permit the entrance of air when the vessel is inverted, is obvious.

With my construction, there is no danger of leakage when the water is poured on the coffee, and a heated cap does not have to be opened when the vessel is inverted.

With my construction, the container vessel, with the pouring vessel on top, may be placed on the stove to keep hot, and ordinary boiled coffee may be prepared with ground instead of pulverized coffee, and the water boiled on a stove in the usual way, and then the two vessels inverted to drain the coffee into the pouring vessel.

Having thus described my invention, what I claim as new and desire to secure by Letters Patent, is:

1. In a coffee pot, the combination with a pouring vessel, of a container for the coffee and water adapted to be inverted over and fitted within the pouring vessel, and a strainer for the inverted container, the container provided with an air inlet for the passage of air from a point inside of said container, at or near the closed end of said container, to a point outside of said container, at or near the open end of said container, the container provided with a recess outside thereof connecting with said air inlet and forming a passageway with the wall of the pouring vessel.

2. In a coffee pot, the combination with a pouring vessel, of a container for the coffee and water adapted to be inverted over and fitted within the pouring vessel, and a strainer for the inverted container, the container provided with an air inlet for the passage of air from a point inside of said container, at or near the closed end of said container, to a point outside of said container, at or near the open end of said container, the container provided with a recess outside thereof connecting with said air inlet and forming a passageway with the wall of the pouring vessel, and an air inlet for the container connecting said passageway with the outside of the assembled pot at a point above the edge of the pouring vessel.

3. In a coffee pot, the combination with a pouring vessel, of a container for the coffee and water adapted to be inverted over and fitted within the pouring vessel, and a strainer for the inverted container, the container provided with a recess around the outside thereof forming a passageway with the wall of the pouring vessel, and an air inlet tube for the container opening through the wall thereof at each end and extending from said passageway to a point above the edge of the pouring vessel when the container is inverted thereon, with a second air tube for the container opening into the passageway at one end and at the other end extending to and opening into the upper end of said container when inverted.

4. In a coffee pot, the combination with a pouring vessel, of a container for the coffee and water adapted to be inverted over and fitted within the pouring vessel, and a strainer for the inverted container with the inverted end of the container of less diameter than the pouring vessel to form a passageway with the wall of the pouring vessel, an outside air inlet for the container opening through the wall thereof at each end, and extending from the passageway to a point above the edge of the pouring vessel when the container is inverted thereon, with a second air tube for the container opening into the passageway at one end and extending to and opening into the upper end of said container when inverted.

5. In a coffee pot, the combination with a pouring vessel, of a container for the coffee and water adapted to be inverted over and fitted within the pouring vessel, and a strainer for the inverted container, the container provided with an air inlet tube for the passage of air from a point inside of said container, at or near the closed end of said container, to a point outside of said container, at or near the open end of said container, said air inlet tube provided with walls forming a gradually decreasing angle with each other from top to bottom to cause said tube to drain readily.

6. In a coffee pot, the combination with a pouring vessel, of a container for the coffee and water adapted to be inverted over and fitted within the pouring vessel, and a strainer for the inverted container, the container provided with a recess on the outside thereof forming a passageway with the wall of the pouring vessel, and an air inlet tube for the container opening through the wall thereof at each end and extending from said passageway to a point above the edge of the pouring vessel when the container is inverted thereon, with a second air tube for the container opening into the passageway at one end and at the other end extending to and opening into the upper end of said container when inverted, said second inlet tube having walls presenting a gradually decreasing angle with each other from top to bottom to cause said tube to drain readily.

7. In a coffee pot, the combination with a pouring vessel, of a container for the coffee and water adapted to be inverted over and fitted within the pouring vessel, and a strainer for the inverted container, said container provided with an air inlet tube at one end opening into the upper end thereof when inverted and at the other end opening through the wall of the container, said inlet tube being triangular in cross section, with two of the walls thereof forming a gradually decreasing angle with each other from top to bottom to cause said tube to drain readily.

8. In a coffee pot, the combination with a pouring vessel, of a container for the coffee and water adapted to be inverted over and fitted within the pouring vessel, and a strainer for the inverted container, with the inverted end of the container of less diameter than the pouring vessel to form an annular passageway with the wall of the pouring vessel, an air inlet tube for the container opening through the wall thereof at each end, and extending from the annular passageway to a point above the edge of the pouring vessel when the container is inverted thereon, with a second air tube for the container opening into the annular passageway at one end and extending to and opening into the upper end of said container when inverted, said second inlet tube being triangular in cross section, with two of the walls thereof forming a gradually decreasing angle with each other from top to bottom to cause said tube to drain readily.

HERBERT L. JOHNSTON.

Attest:
R. W. DEWEESE,
J. E. AGNA.

---

Copies of this patent may be obtained for five cents each, by addressing the "Commissioner of Patents, Washington, D. C."